United States Patent Office 2,827,442
Patented Mar. 18, 1958

2,827,442

CHLOROALKYL ALLYLARYL ETHERS AND POLYMERS THEREOF

Gaetano F. D'Alelio, Pittsburgh, Pa., assignor to Koppers Company, Inc., a corporation of Delaware No Drawing. Application October 20, 1954
Serial No. 463,597

30 Claims. (Cl. 260—47)

This invention is concerned with certain new chloroalkyl allylaryl ethers. It is concerned with these substances in a monomeric as well as polymeric form. Furthermore, the invention is concerned with insoluble or "cured" polymers which can be obtained by treating hydroxyalkyl allylaryl ether polymers to cause cross-linking.

The invention is particularly concerned with chloroalkyl allylaryl ethers of the formula $$CH_2=CH-CH_2-Ar-O-C_nH_{2n}Cl$$

in which Ar is an arylene radical and $n$ is an integer having a value no greater than 8.

In particular the invention is concerned with chloroalkyl allylphenyl ethers. It will be realized that polymers of these monomers contain chloroalkyl groups. These polymers are useful in many polymer applications such as for molding, coatings, laminating and reaction with polyamines and tertiary amines to yield ion-exchange resins.

As used herein the term "polymer" embraces both homopolymers and copolymers. The term "copolymer" as used herein embraces polymeric materials derived from the polymerization of two or more monomeric materials. That is, 2, 3, 4, 5 . . . ad infinitum copolymerizable monomeric substances can be copolymerized to produce "a copolymer." As used herein the terms "parts" and "percentages" indicate parts and percentages by weight unless otherwise specified. The invention is illustrated by, but not restricted to, the following preferred embodiments:

*Example I*

A cold aqueous solution of 4-allylphenolate prepared from 24 parts 4-allylphenol and 8.4 parts sodium hydroxide and 100 parts water is added with stirring over approximately one hour to 500 parts of 1,2-dichloroethane maintained at 75° C. and the mixture is stirred for an additional hour at 75° C. The system is then put under vacuum and the remaining 1,2-dichloroethane and water flashed off. The residue is cooled and extracted with ether. The ether layer is washed with 300 parts water containing 35 parts sodium hydroxide in four portions to remove unreacted 4-allylphenol. The caustic-washed solution is evaporated to yield 2-(4-allylphenoxy)-1-chloroethane. The compound is characterized by analyses for carbon, hydrogen and chlorine and by hydrogen absorption, the results of which are in substantial agreement with the theoretical percentages.

*Example II*

The procedure of Example I is repeated substituting for the 4-allylphenol 25 parts 2-allylphenol. There is obtained 2-(2-allylphenoxy)-1-chloroethane. The compound is characterized by analyses for carbon, hydrogen and chlorine and by hydrogen absorption, the results of which are in substantial agreement with the theoretical percentages.

*Example III*

The procedure of Example I is repeated substituting for the 1,2-dichloroethane there used a similar quantity of 1,2-dichloropropane. There is obtained 2-(4-allylphenoxy)-1-chloropropane. The compound is characterized by analyses for carbon, hydrogen and chlorine and by hydrogen absorption, the results of which are in substantial agreement with the theoretical percentages.

*Example IV*

The procedure of Example I is repeated substituting for the 1,2-dichloroethane there used a similar quantity of 1,3-dichloropropane. There is obtained 3-(4-allylphenoxy)-1-chloropropane. The compound is characterized by analyses for carbon, hydrogen and chlorine and by hydrogen absorption, the results of which are in substantial agreement with the theoretical percentages.

*Example V*

The procedure of Example II is repeated substituting for the 1,2-dichloroethane there used a similar quantity of 1,3-dichloropropane. There is obtained 3-(2-allylphenoxy)-1-chloropropane. The compound is characterized by analyses for carbon, hydrogen and chlorine and by hydrogen absorption, the results of which are in substantial agreement with the theoretical percentages.

It will be realized that in the foregoing examples there can be substituted for the 2-allylphenol and 4-allylphenol therein used similar quantities of allyl compounds illustrated by such compounds as, for example, the allyl-1- and -2-naphthols and the like. Additionally, in place of the particular dihaloalkanes utilized, there can be used other dihaloalkanes such as, for example, the alpha, omega-dihaloalkanes illustrated by such compounds as 1,4-dichlorobutane, 1,5-dichloropentane, 1,6-dichlorohexane, 1,7-dichloroheptane, and 1,8-dichlorooctane. Broadly, the dichloroalkanes containing not more than eight carbon atoms yield desirable results. There are obtained the various chloroalkyl allylaryl ethers of this invention which are characterized by carbon, hydrogen and chlorine analyses and by hydrogen absorption, the results of which are in substantial agreement with the theoretical values.

*Example VI*

One hundred parts of 2-(4-allylphenoxy)-1-chloroethane obtained as in Example I are admixed with three-fourths part benzoyl peroxide. The atmosphere is swept out and filled with nitrogen. The compound is then heated to approximately 80° C. under an atmosphere of nitrogen for approximately three days. There is obtained a polymer of 2-(4-allylphenoxy)-1-chloroethane which is a linear, soluble homopolymer.

There can be substituted for the 2-(4-allylphenoxy)-1-chloroethane here used the various other chloroalkyl allylaryl ethers of this invention such as, for example, the compounds illustrated in Examples II through V inclusive herein and there are obtained linear, soluble homopolymers. Further, for the benzoyl peroxide utilized in this example there can be utilized a variety of peroxy catalysts such as hydrogen, acetyl, acetyl-benzoyl, phthalyl and lauroyl peroxides, tertiary-butyl hydroperoxide, etc., and other percompounds, for example ammonium persulfate, sodium persulfate, sodium perchlorate and the like.

The foregoing example illustrates the preparation of a polymer of a chloroalkyl allylaryl ether having a plurality of repeating units of the formula

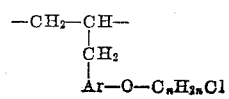

in which Ar is an arylene radical and $n$ is an integer having a value no greater than 8.

It will be realized that mixtures of two or more of the various chloroalkyl allylaryl ethers of this invention can be polymerized according to the foregoing procedure to yield linear, soluble polymers.

*Example VII*

Ninety parts styrene and 10 parts 2-(4-allylphenoxy)-1-chloroethane obtained as in Example I are polymerized according to the procedure set forth in Example VI. There is obtained a linear, soluble copolymer.

*Example VIII*

Example VII is repeated substituting for the styrene there used 90 parts of butadiene. There is obtained a linear, soluble copolymer.

*Example IX*

Example VII is repeated substituting for the styrene there used 90 parts of acrylonitrile. There is obtained a linear, soluble copolymer.

*Example X*

Example VII is repeated substituting for the styrene there used 90 parts of maleic anhydride. There is obtained a linear, soluble copolmyer.

*Example XI*

Example VII is repeated substituting for the styrene there used a similar quantity of methyl methacrylate. There is obtained a linear, soluble copolmyer.

It will be realized that Examples VII through XI illustrate a variety of ethylenically unsaturated monomers which can be copolymerized with chloroalkyl allylaryl ethers. The various chloroalkyl allylaryl ethers of this invention can be utilized in the foregoing procedures for the particular ethers there used. Further, mixtures of one or more of the ethers of this invention can be copolymerized with various copolymerizable ethylenically unsaturated monomers as illustrated in the foregoing examples or with mixtures of two or more of such ethylenically unsaturated monomers to produce polymers. In particular, the monomers of Examples I to V can be copolymerized with such ethylenically unsaturated monomers as styrene, acrylonitrile, butadiene, maleic anhydride and methyl methacrylate according to the procedure of Example VII to produce linear, soluble copolymers contemplated by this invention.

*Example XII*

The procedure of Example VI is repeated utilizing in addition to the monomer there used four parts divinylbenzene. There is obtained an infusible, insoluble polymer which is comminuted and admixed with excess triethylamine and heated at reflux temperature for approximately 8 hours. The mixture is cooled and the resin in the quaternary ammonium chloride form separated by filtration and washed with ether. The resin is treated with aqueous sodium hydroxide and washed with distilled water to yield the quaternary ammonium hydroxide form of the resin which exhibits ion-exchange properties when tested as set forth in Example XIII.

*Example XIII*

One hundred parts by weight of the resin of Example XII is wet with 50 parts by weight of distilled water, and then 100 parts by weight of a standardized hydrochloric acid solution is added with shaking. After the resin and the solution have been in contact for about 15 minutes, the solution is separated from the resin by filtration. The filtrate solution is then titrated with sodium hydroxide to determine the amount of hydrochloric acid still in solution. If the filtrate solution has been completely neutralized by the resin, the procedure is repeated using a larger amount of the hydrochloric acid solution with a fresh sample of the resin. The efficiency of the resin is determined by calculating the ratio of chloride ions actually removed from the solution to the chloride ions theoretically removable. An excellent efficiency is indicated by these calculations.

*Example XIV*

The exhausted resin of Example XIII is regenerated by treatment with about one-third normal sodium hydroxide solution. After the solution is removed by filtration the resin is washed well with distilled water and retested for its anion-adsorption capacity according to the above-mentioned procedure. The efficiency after regeneration approximates the original capacity of the resin.

*Example XV*

One hundred parts of the resin of Example VI is admixed with 5 parts ethylene diamine and the mixture heated to approximately 100° C. There is obtained a thermoset resin.

*Example XVI*

One hundred parts of the resin of Example VII is admixed with 5 parts ethylene diamine and the mixture heated to approximately 100° C. There is obtained a thermoset resin.

It will be realized that in general diamino compounds function as cross-linking agents for the polymers of this invention by reacting with the chloroalkyl constituents of said polymers to produce thermoset resins. Illustrative of alkylene diamines and arylene diamines which are useful, are such compounds as propylene diamine, hexylene diamine, phenylene diamine, the various naphthylene diamines and guanazole.

As used herein the term "aryl" embraces a variety of aromatic nuclei such as phenyl, naphthyl, and the lower alkyl and halogen substituted nuclei, that is the aryl nuclei containing one or more methyl, ethyl, propyl, butyl, chloro- or bromo-substituents.

While the invention has been described with reference to particular embodiments thereof, it will be understood that in its broadest aspects the invention may be variously embodied within the scope of the invention as set forth herein and in the appended claims.

What is claimed is:

1. A chloroalkyl allylaryl ether of the formula $$CH_2=CH-CH_2-Ar-O-C_nH_{2n}Cl$$

in which Ar is an arylene radical and $n$ is an integer having a value no greater than 8.

2. 2-(4-allylphenoxy)-1-chloroethane.
3. 2-(3-allylphenoxy)-1-chloroethane.
4. 2-(4-allylphenoxy)-1-chloropropane.
5. 3-(4-allylphenoxy)-1-chloropropane.
6. 2-(2-allylphenoxy)-1-chloroethane.
7. A homopolymer of a chloroalkyl allylaryl ether of claim 1.
8. A polymer of a chloroalkyl allylaryl ether having a plurality of repeating units of the formula

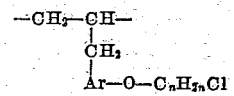

in which Ar is an arylene radical and $n$ is an integer having a value no greater than 8.

9. A copolymer of a chloroalkyl allylaryl ether of claim 1 and at least one copolymerizable ethylenically unsaturated monomer.

10. A copolymer of 2-(4-allylphenoxy)-1-chloroethane and a polymerizable mass comprising at least one copolymerizable ethylenically unsaturated monomer.

11. A copolymer of claim 9 in which the polymerizable mass comprises styrene.

12. A copolymer of claim 9 in which the polymerizable mass comprises butadiene.

13. A copolymer of claim 9 in which the polymerizable mass comprises acrylonitrile.

14. A copolymer of claim 9 in which the polymerizable mass comprises maleic anhydride.

15. A copolymer of claim 9 in which the polymerizable mass comprises methyl methacrylate.

16. An insoluble polymer of a chloroalkyl allylaryl ether of claim 1, said polymer containing a plurality of cross-linkages derived from said chloroalkyl groups.

17. An insoluble polymer of a polymerizable mass comprising at least one polymerizable ethylenic monomer and 2-(4-allylphenoxy)-1-chloroethane, said polymer containing a plurality of cross-linkages derived from said chloroalkyl groups.

18. An insoluble polymer of claim 16 in which the polymerizable mass comprises styrene.

19. An insoluble polymer of claim 16 in which the polymerizable mass comprises butadiene.

20. An insoluble polymer of claim 16 in which the polymerizable mass comprises acrylonitrile.

21. An insoluble polymer of claim 16 in which the polymerizable mass comprises maleic anhydride.

22. An insoluble polymer of claim 16 in which the polymerizable mass comprises methyl methacrylate.

23. A copolymer of 2-(3-allylphenoxy)-1-chloroethane and a polymerizable mass comprising at least one copolymerizable ethylenically unsaturated monomer.

24. A copolymer of 2-(4-allylphenoxy)-1-chloropropane and a polymerizable mass comprising at least one copolymerizable ethylenically unsaturated monomer.

25. A copolymer of 3-(4-allylphenoxy)-1-chloropropane and a polymerizable mass comprising at least one copolymerizable ethylenically unsaturated ether.

26. A copolymer of 2-(2-allylphenoxy)-1-chloroethane and a polymerizable mass comprising at least one copolymerizable ethylenically unsaturated monomer.

27. An insoluble polymer of a polymerizable mass comprising at least one polymerizable ethylenic monomer and 2-(3-allylphenoxy)-1-chloroethane, said polymer containing a plurality of cross-linkages derived from said chloroalkyl groups.

28. An insoluble polymer of a polymerizable mass comprising at least one polymerizable ethylenic monomer and 2-(4-allylphenoxy)-1-chloropropane, said polymer containing a plurality of cross-linkages derived from said chloroalkyl groups.

29. An insoluble polymer of a polymerizable mass comprising at least one polymerizable ethylenic monomer and 3-(4-allylphenoxy)-1-chloropropane, said polymer containing a plurality of cross-linkages derived from said chloroalkyl groups.

30. An insoluble polymer of a polymerizable mass comprising at least one polymerizable ethylenic monomer and 2-(2-allylphenoxy)-1-chloroethane, said polymer containing a plurality of cross-linkages derived from said chloroalkyl groups.

References Cited in the file of this patent

Butler et al.: Journ. Amer. Chem. Soc., vol. 73, April 1951, pp. 1512–15-13. (Copy in Scientific Library.)